US012189718B1

(12) United States Patent
Das et al.

(10) Patent No.: US 12,189,718 B1
(45) Date of Patent: Jan. 7, 2025

(54) LEARNED STATE COVARIANCES

(71) Applicant: Zoox, Inc., Foster City, CA (US)

(72) Inventors: Subhasis Das, Menlo Park, CA (US); Shida Shen, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/087,374

(22) Filed: Dec. 22, 2022

Related U.S. Application Data

(63) Continuation of application No. 16/862,911, filed on Apr. 30, 2020, now Pat. No. 11,537,819.

(51) Int. Cl.
| | |
|---|---|
| G06V 20/56 | (2022.01) |
| G06F 18/21 | (2023.01) |
| G06F 18/24 | (2023.01) |
| G06F 18/25 | (2023.01) |
| G06N 5/04 | (2023.01) |
| G06N 20/00 | (2019.01) |
| G06T 7/277 | (2017.01) |
| H04W 4/44 | (2018.01) |

(52) U.S. Cl.
CPC ............ *G06F 18/217* (2023.01); *G06F 18/24* (2023.01); *G06F 18/25* (2023.01); *G06N 5/04* (2013.01); *G06N 20/00* (2019.01); *G06T 7/277* (2017.01); *G06V 20/56* (2022.01); *H04W 4/44* (2018.02); *G06T 2207/10028* (2013.01); *G06T 2207/10044* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,335,348 B2* | 12/2012 | Srikrishnan | G06T 7/277 382/103 |
| 9,934,440 B1 | 4/2018 | Kim et al. | |
| 2019/0130188 A1* | 5/2019 | Zhou | G06T 7/248 |
| 2019/0147610 A1 | 5/2019 | Frossard et al. | |
| 2019/0258878 A1 | 8/2019 | Koivisto et al. | |
| 2021/0027103 A1 | 1/2021 | Brower | |
| 2021/0284184 A1 | 9/2021 | Song et al. | |

OTHER PUBLICATIONS

Office Action for U.S. Appl. No. 16/862,911, mailed on Apr. 26, 2022, Das, "Learned State Covariances" 15 Pages.

* cited by examiner

*Primary Examiner* — Vikkram Bali
(74) *Attorney, Agent, or Firm* — Lee & Hayes, P.C.

(57) ABSTRACT

Techniques are disclosed for a covariance model that may generate observation covariances based on observation data of object detections. Techniques may include determining observation data for an object detection of an object represented in sensor data, determining that track data of a track is associated with the object, and inputting the observation data associated with the object detection into a machine-learned model configured to output a covariance (a covariance model). The covariance model may output one or more observation covariance values for the observation data. In some examples, the techniques may include determining updated track data based on the track data, the one or more observation covariance values, and the observation data.

21 Claims, 4 Drawing Sheets

LEARNED STATE COVARIANCES

CROSS-REFERENCE TO RELATED APPLICATION

This application is a continuation of U.S. patent application Ser. No. 16/862,911 entitled "Learned State Covariances," filed Apr. 30, 2020, which is expressly incorporated herein by reference in its entirety.

BACKGROUND

Techniques for detecting and tracking objects are used in numerous applications, such as operating autonomous vehicles, identifying individuals for security purposes, etc. Such techniques may use sensors to capture data of an environment and use this sensor data to detect objects in the environment. Detection and tracking components may include Kalman filters and other similar components that may be used in estimating a state of an object at an instant in time. Such Kalman filters and similar components may utilize measurement or observation covariances to operate, which may be difficult to determine and may be estimated or selected by engineers in a trial and error process.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
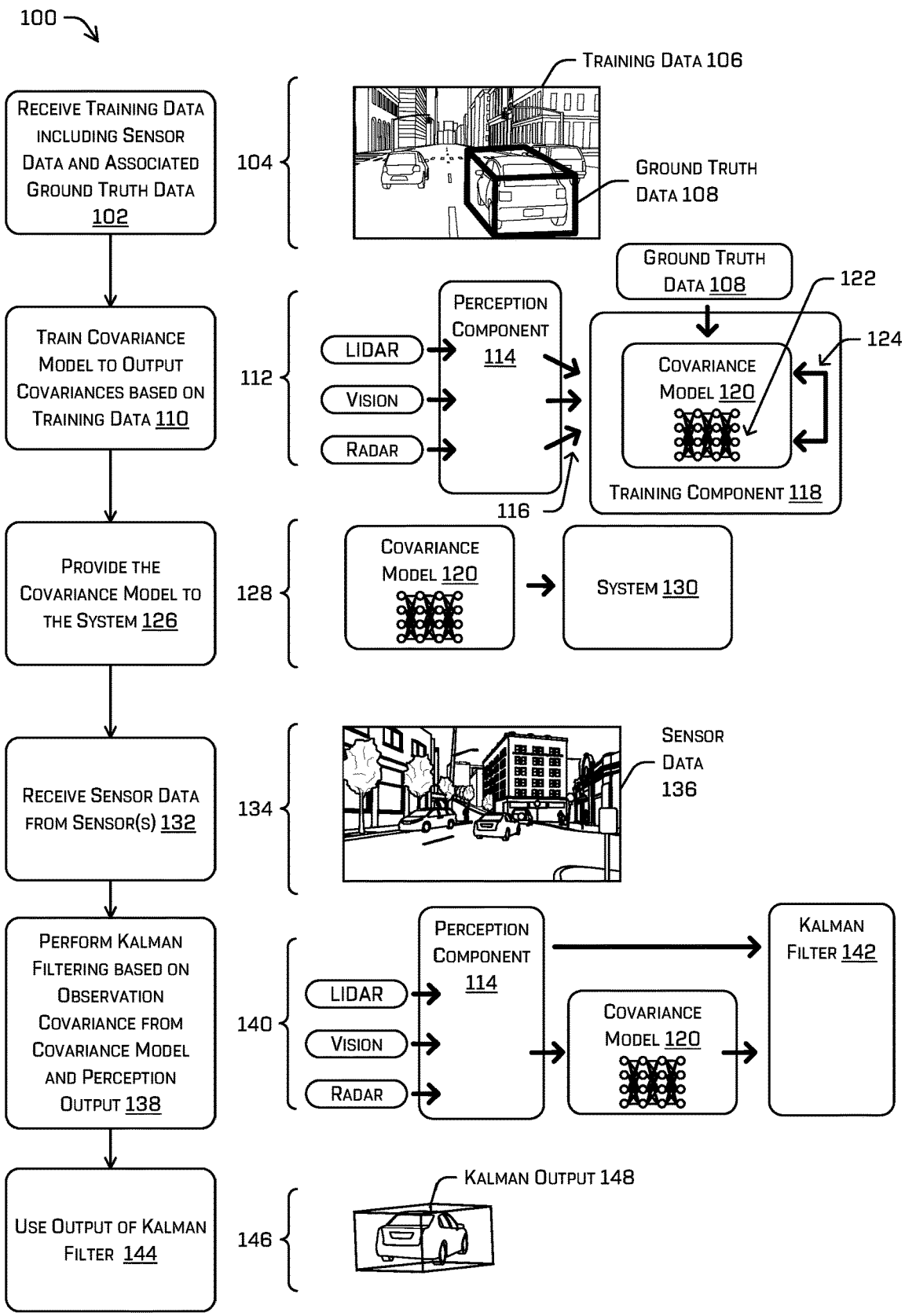
FIG. 1 illustrates a pictorial flow diagram of an example process for training a covariance model and using the covariance model to generate an observation covariance matrix that may be used by a Kalman filter.

Techniques for detecting and/or tracking objects based on a learned covariance model are discussed herein. In some examples, a perception system may detect and/or track an object based on image data, lidar data, and/or radar data. Further, a perception system may include one or more processing pipelines that output bounding box(es) (or other data) associated with an object based on the aforementioned sensor data. Data from the various processing pipelines can be input to a Kalman filter or similar systems to fuse or otherwise combine data from different sensor modalities, data based on sensor data (e.g., bounding boxes), and/or data over time (e.g., a track of an object). In addition, the Kalman filter or similar system may operate based on covariance data such as state covariances, process covariances, and/or observation covariances. A covariance model can learn (e.g., using machine learning techniques) to output observation covariance data based on sensor data or pipeline data, which can be input to the Kalman filter or similar system to fuse or otherwise combine data from different sensor modalities, data based on sensor data (e.g., bounding boxes), and/or data over time (e.g., a track of an object). A loss can be determined, for example, based on a difference between a ground truth bounding box and a model bounding box output by the covariance model, and such loss can be used to train the covariance model to ultimately improve the observation covariances upon which the Kalman filter or similar system operates. In turn, utilizing the improved observation covariances may improve the output of the filter, such as when used for fusing or combining of the data from different sensor modalities, data based on sensor data (e.g., bounding boxes), data over time (e.g., a track of an object), or the like. Thus, the techniques herein can be used to improve an accuracy of object detection and/or object tracking.

In some examples, the techniques discussed herein generally relate to a learned covariance model (also referred to herein as "covariance model") that may determine covariance(s) for object characteristics that may be utilized as input to a filter (such as a Kalman filter) or similar systems. For example, a Kalman filter may be utilized to determine fused observation data for an object (e.g., a tracked object associated with a track) based at least in part on observation data output from one or more pipelines (e.g., a series of steps or operations performed on data to yield a particular result which, in at least some examples, comprise the use of data of a particular type or sub-type).

As noted above, and in some examples, the one or more pipelines (which, throughout may be referenced as perception pipelines, as they may operate on perception data) may be associated with different sensor types (e.g., a pipeline associated with a single type of sensor(s), such as lidar sensor(s), camera(s), radar sensor(s); and/or a pipeline associated with a hybrid combination of sensors such as lidar-vision, and/or the like). A tracking component of the perception component may accept input from the one or more pipelines and generate one or more tracks. More particularly, a tracking component may be configured to output a track comprising the current and/or previous position, velocity, acceleration, classification and/or heading of a detected object (or tracked object) based on pipeline data received from the one or more pipelines. In some examples described herein, a track may comprise an association of detections over a period of time with a historical record of previous positions, orientations, sizes (extents), classifications, etc. of a detected object, in addition to kinematic and/or dynamic information associated with such an object over time (e.g., linear and/or angular velocity, linear and/or angular accelerations, etc.). Of course, though discussed for illustrative purposes for use with perception and tracking, the invention is not meant to be so limiting. The learned covariance models described herein may be used in any process which uses a covariance for state estimation and/or propagation (e.g., Kalman filters).

In some autonomous vehicle implementations of an autonomous operation system, a classification of a tracked object may include general categories such as vehicle, pedestrian, bicyclist, and clutter. Further, such classifications may include specific subcategories. For example, for a general classification of vehicle, subcategories of the classification can include, but are not limited to, a service vehicle, motorcycle, tractor-trailer, sedan, pickup, and so on.

A Kalman filter or similar system may be utilized to fuse observation data output from individual perception pipelines to provide fused observation data that is more accurate than observation data output by each individual pipeline alone. Examples of observation data include, but are not limited to, position (e.g., $<x,y,z>$) and/or rotation (e.g., roll, pitch, yaw) data associated with an object (together a pose), extents of the object (e.g., length, width, height), and the like. Generally, a Kalman filter may work in a two-step process, which may include a prediction operation and an update operation. In the prediction operation, the Kalman filter may produce an estimate of current state variables, along with their uncertainties. Once a new measurement (which may include some amount of error, including random noise) is observed or received, the estimates may be updated using a weighted average, with more weight being given to estimates with higher certainty. Kalman filters may operate using current observation data (e.g., measurements), a previously calculated state, and a state covariance matrix without additional past information.

In some examples, Kalman filters may also operate using an observation covariance matrix. The observation covariance matrix may represent a measure of the error or uncertainty in the observations. In general, a covariance may be a measure of the joint variability of two random variables. If greater values of one input tend to correspond with greater values of the other input, and the same holds for lesser values, (e.g., the inputs tend to show similar behavior), the covariance may be positive. In the opposite case, when greater values of one input mainly correspond to lesser values of the other, (e.g., the inputs tend to show opposite behavior), the covariance may be negative. The sign of the covariance therefore may show the tendency in the linear relationship between the inputs. A covariance matrix may be a square matrix giving the covariance between each pair of elements of a given input vector. Therefore, in some examples, the observation covariance matrix may be a square matrix giving the covariance between each pair of values to be input to the Kalman filter.

Techniques and systems in accordance with this disclosure may provide one or more machine learned models, collectively referred to herein as a covariance model or as a learned covariance model, that may provide covariances, for example, of an observation covariance matrix for each observation that is to be input to a Kalman filter.

In some examples, the covariance model may be utilized in the automated operation system of an autonomous vehicle or similar autonomous or partially autonomous systems. The covariance model may output an observation covariance matrix that may be utilized by a Kalman filter in an update operation that may determine an output to the prediction and/or planning components of the automated operation system. In turn, the prediction and/or planning components may utilized the output from the Kalman filter to predict the changes in behavior of the corresponding object associated with the observation and/or plan a trajectory or other actions for the autonomous operation system.

The techniques discussed herein may improve detecting and tracking of objects by, for example, increasing the accuracy of the output of the Kalman filter or similar components that utilize the observation covariance matrix and/or improve detections of objects, generally. Generally, observation covariance matrix values have been estimated by veteran engineers based on experience working with the systems in question. These estimated observation covariance matrix values were then verified by trial and error. However, such a system does not allow for flexibility in operation or for the observation covariance matrix values to be determined for each observation. Techniques and systems according to this disclosure may improve on the function of Kalman filters by reducing reliance on human experience and estimation and by providing observation covariance matrix values specific to the observation that is to be input to the Kalman filter. Thus, the operation of the covariance model to produce observation covariance matrix values may improve the accuracy of the Kalman filter output as well as make system development simpler.

In some examples, the covariance model may operate based at least in part on the output of a plurality of perception pipelines and/or the output of a tracking component. For example, the covariance model may operate based on the output of a plurality of perception pipelines and the observation covariance matrix values may be utilized by a Kalman filter in fusing the observations that are associated with a track into values for the track, which may then be output to the planning component and/or prediction component.

The pipeline data may include information about object detections by respective pipelines. The perception pipeline associated with an observation may process the sensor data from the associated sensor(s) to provide feature data for an associated object. For example, such features may include a bounding box for the associated object (e.g., three dimensional coordinates, extents for each dimension and/or a yaw), a classification of the associated object (e.g., pedestrian, vehicle, etc.), distance information, an environment classification (e.g., highway vs. residential), and/or an occlusion state.

A tracking component of the perception component may be configured to track and output a current and/or previous position, velocity, acceleration, and/or heading of a detected object based on pipeline data received from the perception pipelines. In some examples, the output of the plurality of perception pipelines may be aggregated into track data associated with a tracked object by the tracking component. In some examples, the output of the Kalman filter may be included in the track data.

In general, tracking may comprise determining whether to associate a current object detection (e.g., observation) generated from recently received (e.g., current) sensor data with one or more other object detections generated from other (e.g., formerly received) sensor data. Track data of a track may identify that an object detected in earlier sensor data and current sensor data and/or current pipeline data output by multiple perception pipelines is the same object. In some examples, the data aggregated into the track data may comprise fused observation data or state information output of the Kalman filter for the tracked object, a current state of the Kalman filter, and/or a portion of the pipeline data output for the current time and/or one or more previous times.

In operation, upon determining received observation data is associated with a tracked object of an existing track, the current state of the Kalman filter for the existing track may be loaded or otherwise input into the Kalman filter. The observation data may be input to the covariance model. The covariance model may output observation covariance values of the observation covariance matrix for the observation data. The observation data and observation covariance matrix may be input to the Kalman filter. The Kalman filter may be operated through a predict and update cycle based on the observation data and observation covariance matrix and output fused observation data or state information for the tracked object associated with the observation data. Many variations are contemplated.

For example, the covariance model may provide observation covariance values trained for objects within the classification of the observed object. In other words, the covariance model may output different observation covariance values for different classifications (e.g., if the classification of the associated object were changed and the observation data input were the same, the observation covariance values may differ). In another example, the covariances of various observed features, such as position coordinates and extents, may differ for vehicles and pedestrians even if the other inputs were the same. Classification specific observation covariances may be provided through a variety of approaches. In a first example, the ML model of the covariance model may include multiple output heads. Each head may provide an output for an associated classification of observed objects. At least some of the connections from the input layer to the different heads may be shared. In a second example, the covariance model may load or otherwise use different machine learned parameters for the machine learned (ML) model, or different ML models, based on the classification of the observed object prior to inputting the observation data to the ML model of the covariance model.

Similarly, in examples that utilize multiple types of sensors, the covariance model may provide observation covariance values trained for an associated sensor type or perception pipeline. For example, the covariance model may output different observation covariance values for observation data based on lidar sensor data that for the same values of observation data based on image sensor data or radar sensor data. In some examples, a type of Kalman filter or predict and update cycle used may vary depending on, for example, a type of associated sensor type or perception pipeline. For example, an Extended Kalman filter or Unscented Kalman filters may be utilized for radar data while a different Kalman filter can be used for other sensor data. The covariance model may also provide observation covariance values trained for associated types of filters.

In another example, the covariance model may provide observation covariance values trained for an associated environment or category of location of the observed object. For example, the covariance model may output first observation covariance values for observation data that are associated with an object on a highway that is different from second observation covariance values for the same values of observation data associated with an object in a residential area or parking lot.

In examples in which a covariance model includes multiple output heads, individual heads may be associated with a respective set of situational factors including one or more of a classification of the object (e.g., vehicle, pedestrian, etc.), a type of sensor or format of data associated with the observation data 116 (e.g., lidar sensors, radar sensors, image sensors, etc.), and/or an environment or location classification (e.g., highway, residential road, parking lot, etc.). Each output head may include outputs for covariance values and estimated object characteristics (e.g., a covariance model generated bounding box). For example, an output head for a car in a parking lot may have outputs for covariance values and outputs for a model generated bounding box including position (e.g., <x,y,z>) and/or rotation (e.g., roll, pitch, yaw) data associated with an object (together a pose), extents of the object (e.g., length, width, height), and the like. The model generated bounding box may be utilized in training the covariance model as discussed below.

In some examples, the sensors may input sensor data to the perception pipelines at intervals or in input cycles. The perception pipelines may generate and output pipeline data to the tracking component for each input cycle. In some examples, the pipelines may be synchronized to generate pipeline outputs at a frequency that may correspond to input cycles (e.g., every 100 milliseconds, every 500 milliseconds, every second, etc.). In an example where the pipelines are synchronized to output pipeline data at substantially the same time every 500 milliseconds (e.g., 500 ms cycles), the track data may comprise the data discussed above for 0 milliseconds (e.g., a set of data corresponding to a most recently received sets of pipeline data the current input cycle), −500 milliseconds, −1 second, and so on. In at least one example, the track data may comprise pipeline data for the time steps 0 milliseconds, −100 milliseconds, −200 milliseconds, −300 milliseconds, and/or −400 milliseconds, and/or −1 second, −2 seconds, and/or −3 seconds, although any suitable time steps or cycle length may be used. That is, track data can comprise recent (past) observations about an object in addition to current data about the object. In some examples, observation data for a track associated with every time cycle or interval (e.g., every other cycle) over a time window may be input to the covariance model to obtain observation covariance values. The observation covariance values and the observation data for the track may be used to fuse new observation data at each cycle or interval.

As mentioned above, the pipeline data may include information about object detections which may be utilized to determine the track. For example, the pipeline data may comprise an indication of one or more regions of interest (ROIs) determined by an ML model of at least one of the pipelines and identifying a portion of sensor and/or perception data associated with the object. For example, the pipeline data output by a pipeline may comprise a center, extents, and/or yaw of a region of interest (ROI) associated with an object detected by the pipeline. In some examples, the region of interests discussed herein may be a three-dimensional region of interest and/or a two-dimensional region of interest (e.g., a top-down/bird's eye perspective of the environment). Some examples may include receiving multiple regions of interest (ROIs) for different portions of an image. The ROIs may be in any form that may identify the representation of an object in the image. For example, an ROI may include a box or other shape indicative of pixels identified as being associated with the detected object (a "bounding box"), a mask that includes pixels that correspond to the detected object, etc.

The tracking component of the perception component may utilize the information about object detections to match object detections from multiple pipelines and object detections from different input cycles. The tracking component may generate track data for a track that includes information about the matched object detections. As such, in some examples, the track may comprise the center, extents, and/or yaw of a region of interest (ROI) associated with an object and/or similar information regarding previous ROI(s) generated in association with the track in prior cycles.

The track data may additionally or alternatively include other data about the tracked object. For example, the track data may include a classification associated with the object (e.g., a vehicle, an oversized vehicle, a pedestrian, a cyclist), a current/or previous heading associated with the object, a current and/or previous velocity and/or acceleration of the object, and/or a current and/or previous position of the object.

In some examples, other components may utilize the track data output by the tracking component to control an autonomous vehicle. For example, a planning component of an autonomous vehicle may predict motion/behavior of the detected object and determine a trajectory and/or path for controlling an autonomous vehicle based at least in part on such current and/or previous data.

As mentioned above, some perception pipelines of the perception component may be associated with and operate based on data from respective sets of sensors. Some example perception pipelines associated with respective sets of sensors may include single sensor type pipelines, such as a vision pipeline, a lidar pipeline, a radar pipeline and so on, and/or combined sensor type pipelines, such as a vision-lidar pipeline, a vision-lidar-radar pipeline, and/or the like. In some examples, at least one perception pipeline may be a fusion detector or deep tracking network component which may operate based at least in part on data from other perception pipelines. For example, see U.S. patent application Ser. No. 16/779,576 which claims the benefit of U.S. Patent Application No. 62/926,423, both of which are incorporated by reference herein in their entirety.

As mentioned above, the tracking component may receive the information regarding detections output by the one or more perception pipelines as pipeline data. The tracking component may compare the information regarding detections in the pipeline data to determine tracks that relate to the same object. Pipeline data related to the same object may be combined to generate track data. For example, pipeline data from a pipeline may be compared to data of existing tracks to determine whether an existing track matches the pipeline data. If an existing track is found to match the pipeline data, the track data may be incorporated into the existing track data. Otherwise, a new track may be generated based on the pipeline data. Additional details related to the generation of tracks by the tracking component are provided in U.S. patent application Ser. No. 16/297,381, which is incorporated by reference herein in its entirety.

The current observation data included in the track data may be analyzed by the covariance model to generate an observation covariance matrix. The current observation data and the observation covariance matrix may be input to the current state of the Kalman filter to generate fused observation data or state information for the tracked object associated with the current observation data.

For a given set of situational or background data (e.g., one or more of a classification of the tracked object (e.g., vehicle, pedestrian, etc.), a type of sensor or format of data associated with the current observation data (e.g., lidar sensors, radar sensors, image sensors, etc.), and/or an environment or location classification (e.g., highway, residential road, parking lot, etc.)), the covariance model may, in some examples, comprise a machine learned model that may infer both the observation covariance values and estimated object characteristics for observation data associated with the tracked object. As mentioned above, at least some examples may include ML model(s) with multiple output heads, each outputting observation covariance values corresponding to an associated set of situational or background data.

In at least one non-limiting example, the covariance model may be a multi-layer perceptron which may receive track data including current observation data (e.g., from one of multiple perception pipelines) and a current state of a Kalman filter as input. From this information, the covariance model may generate observation covariance values for the current observation data values. The Kalman filter may then perform a predict-update cycle based on the current observation data values, the observation covariance values, and the current state of the Kalman filter to generate fused observation data for the object associated with the track data.

While examples are provided above, implementations are not so limited and details may vary from implementation to implementation. For example, while in examples provided herein, sensor data is preprocessed by perceptions pipelines prior to being input to the covariance model as observation data (e.g., observed bounding boxes, distance information, environment or track classification, track occlusion state, etc.), other examples, such as examples with lower constraints on resources, may utilize raw perception data instead of or in addition to the observation data. Additional details relating to non-limiting example systems for training and utilizing the covariance model are provided below with reference to the figures.

Example Scenario

FIG. 1 illustrates a pictorial flow diagram of an example process 100 for training a covariance model and using the covariance model to generate an observation covariance matrix that may be used by a Kalman filter to fuse observation data.

At operation 102, a computing device may receive training data including sensor data and associated ground truth data. In one example, the computing device may receive user annotated data indicating ground truth bounding box(es) (e.g., X, Y, Z position coordinates, X, Y, Z extents, and an orientation (roll, pitch, and/or yaw)), ground truth distance information, ground truth track classification(s), ground truth track occlusion state data and so on. For example, a user may view sensor data through a display on a client device and provide input to designate a ground truth bounding box for an object (e.g., use a mouse, touch screen, or other device to draw a box, place a box and update a corner of the box, etc.). In some instances, the user or the computing device may designate an identifier for a ground truth bounding box, such as an identifier that identifies a type of object within the ground truth bounding box (e.g., a classification associated with the object), a unique identifier that identifies a specific object within the ground truth bounding box, etc. An object may include a vehicle, person, sign, road, structure (e.g., building), and/or any other object. In another example, the computing device may receive annotated data from an application, system, and/or other entity. In examples, annotated data may be received for various frames. Further, in examples, annotated data may be received over time for various environments. Annotated data may be stored by the computing device in a data store and accessed at any time, such as to perform the operation 102.

Sensor data may include Light Detection and Ranging (lidar) data, radar data, depth sensor data (time of flight, structured light, etc.), image data (e.g., still images, video images, etc.), and/or any other form of data captured by a sensor. Further, in some examples, lidar data is collected over a period of a time, such as the time for revolution of a spinning lidar device, or collection of lidar devices, (also referred to as "meta spin"). In some examples, sensor data is captured by a vehicle, such as an autonomous vehicle, while the vehicle traverses an environment. In other examples, the sensor data is captured by other systems.

Example 104 illustrates training data 106 including sensor data that may be displayed to a user and a ground truth data 108 (e.g., shown here as the bounding box) that may be designated by the user) and/or from a more powerful machine (e.g., one or more computing devices providing more processing power and/or a more complex perception algorithm) and/or from logged data. In this example, the sensor data of the training data 106 comprises image data. In other examples, the sensor data may comprise lidar data or other forms of data, such as points captured by a lidar sensor. Here, the sensor data represents objects in an urban environment, such as cars, trucks, roads, buildings, bikes, pedestrians, etc. However, the sensor data may represent objects in any type of environment.

At operation 110, the computing device may train the covariance model to output observation covariance values based on the training data 106. As discussed above, the observation covariance matrix of a Kalman filter or similar system may be populated with the observation covariance values output by the trained covariance model. More particularly, the computing device may train a machine learned model of the covariance model to accept observation data as input and output observation covariance values that may represent covariances between each input or variable that is input to the Kalman filter or similar system. For example, the input to the Kalman filter may include state information be a seven value vector including the values of the object bounding box (e.g., X, Y, Z position coordinates, X, Y, Z extents, and a yaw). In such an example, the observation covariance matrix may be a seven by seven square matrix including covariances between these inputs. Of course, examples of state information may use more or fewer values resulting in various sizes of observation covariance matrices, and are not limited to the examples discussed herein.

In operation 110, the training may be based on ground truth data 108 and observation data output by perception pipeline(s) which may include an object bounding box (e.g., X, Y, Z position coordinates, X, Y, Z extents, and a yaw), distance information, an environment classification, track occlusion state data and so on.

For instance, the computing device may process the logged sensor data of the training data 106 with a perception system. The perception system may detect objects in the sensor data and determine tracks for detected objects. In particular, in some examples, each pipeline of the perception system may determine object detections from sensor data generated by one or more sensor types (e.g., discrete sensor types such as lidar, RGB camera, thermal image, sonar, radar; or hybrid sensor types such as vision-lidar association, lidar-radar association). The tracks may be determined over time as portions of the sensor data at different times (e.g., frames of the sensor data) are processed. The perception system may also implement any number of techniques to determine bounding boxes for objects represented in the sensor data.

The perception system may associate each object detection with a track. A track of an object may include a path traveled by the object. A track of an object may represent (or be based on) a current or previous position, velocity, acceleration, orientation, and/or heading of the object over a period of time (e.g., 5 seconds). The observation data of the current detection may be aggregated into an existing track that is associated with the object detection.

Once a track has been associated with the current object detection, the computing device may determine similarities between ground truth bounding boxes in the ground truth data 108 and the associated track. For example, the computing device may determine, for a track, a score between a ground truth bounding box and the observation data of the track. A score may indicate how closely a ground truth bounding box matches a bounding box associated with an object track (e.g., a representative bounding box for the object track). In some examples, intersection over union (IOU) techniques may be used to determine a score. The computing device may identify an object track that is the most similar to a ground truth bounding box based on the scores. The computing device may map the ground truth bounding box to the associated track. In some examples, the computing device may determine a score based at least in part on an IOU between the ground truth bounding box and the bounding box associated with an object track, a Euclidean distance between centers of the ground truth bounding box and the bounding box associated with an object track, a Munkres match between the ground truth bounding box and the bounding box associated with an object track, and/or the like.

The computing device may determine one or more characteristics associated with a situation in which sensor data was captured. The one or more characteristics may include a velocity of an object or a vehicle when the sensor data was captured, a distance from the vehicle to an object when the sensor data was captured, an amount of time a track has existed (e.g., 3 seconds, 1 minute, etc.), a proximity of the vehicle or the object to a road feature (e.g., intersection, parking lane, etc.) when the sensor data was captured, a geolocation of the vehicle, a confidence of a technique used to generate a bounding box, a ratio of empty space to occupied space within a bounding box associated with the sensor data, an occlusion state of the object, etc.

The computing device may then train a model associated with the situational or background characteristics to output observation covariance values and a new model bounding box based on the observation data output by the perception pipeline(s). For example, the covariance model may be trained to accept input which may include an object bounding box (e.g., X, Y, Z position coordinates, X, Y, Z extents, and a yaw), distance information, an environment classification, track occlusion state data and so on.

Example 112 illustrates an example training process for the covariance model. A perception component 114 may receive logged sensor data of the training data 106 and, based thereon, determine observation data 116 associated with tracks. The perception component 114 may output observation data 116 for each track to a training component 118. The training component 118 may receive the ground truth data 108 of the training data and the observation data 116. To train the covariance model 120 on the observation data 116 of an object associated with a track, the training component 118 may determine ground truth data corresponding to the observation data 116 (e.g., using an intersection of union (IOU) between bounding boxes of the ground truth data 108 and the observation data). The training component may provide the observation data 116 for the object to the covariance model 120. Based on one or more of a classification of the object (e.g., vehicle, pedestrian, etc.), a type of sensor or format of data associated with the observation data 116 (e.g., lidar sensors, radar sensors, image sensors, etc.), and/or an environment or location classification (e.g., highway, residential road, parking lot, etc.), the covariance model 120 may determine a machine learned (ML) model 122 or an output head of the ML model 122 that may infer the observation covariance values associated with the object. The covariance model 120 may input the observation data 116 to the ML model 122. The ML model may output observation covariance values and estimated object characteristics (e.g., a model generated bounding box) for the observation data 116. The training component 118 may determine a difference between the estimated object characteristics and the ground truth data (e.g., a difference between a model generated bounding box and a ground truth bounding box). The difference may then be used to backpropagate loss(es) through the ML model 122. More particularly, the differences in bounding boxes may be treated as errors in the observation covariance values and these errors may be used to determine losses for back propagation 124. For example, the loss may be determined as the negative log likelihood as:

$$\frac{1}{2\sigma^2}\|y_i - f^{\hat{w}_i}(x_i)\|^2 + \frac{1}{2}\log\sigma^2$$

where $y_i$ is the ground truth bounding box vector, $f^{W_i}(x_i)$ is the model bounding box vector output by the current output head or model, and $\sigma^2$ is a matrix of the covariance values output by the current output head or model. Of course, this is just an example and many other approaches are possible.

The training process may continue until a cumulative loss for a window of training data or tracks is less than a threshold, until a difference between losses in various iterations is less than a threshold, until a number of iterations has been reached, and the like.

At operation 126, the computing device may provide the covariance model to a system. In one example, the computing device may send the covariance model to a vehicle to implement the machine learned model within a system on the vehicle, such as a perception system. In another example, the computing device may be part of a vehicle and the computing device may send the covariance model to a system on the vehicle. In yet other examples, the covariance model may be sent to other systems, such as any system using machine vision. In examples, the covariance model is provided over a network. Example 128 illustrates that the covariance model 120 is provided to a system 130.

At operation 132, a system (e.g., the system 130) may receive sensor data from one or more sensors. The system may comprise a computing device on a vehicle and/or any other computing device. The system may be configured to implement the covariance model that is trained at the operation 110. The sensor data may be captured by the one or more sensors while the system traverses an environment. Example 134 illustrates the sensor data 136 that is received from one or more sensors.

At operation 138, the system may perform Kalman filtering on observation data based on the covariance model (e.g., the system may input observational data into a Kalman filter). For example, the system may process the sensor data received at the operation 132 to generate observation data for objects represented in the sensor data. The covariance model may use the observation data to output observation covariance values to the Kalman filter. The Kalman filter may receive the observation covariance values and observation data as input. The Kalman filter may provide an output based on the current state of the Kalman filter, the observation data and the observation covariance values. For example, the Kalman filter may fuse, aggregate, or otherwise combine observation data output from individual perception pipelines to provide more accurate observation data than each individual pipeline alone.

Example 134 illustrates a perception component 114 that may receive sensor data from various sources (e.g., lidar, vision sensors, radar, etc.). Upon receiving an input of sensor data from one of the sensor systems, a perception pipeline of the perception component 114 associated with the sensor data may process the sensor data from the associated sensor(s) to provide observation data for detected objects. For example, such observation data for a detected object may include a bounding box for the associated object (e.g., three dimensional coordinates, extents for each dimension and or a yaw), a classification of the associated object (e.g., pedestrian, vehicle, etc.), distance information, an environment classification (e.g., highway vs. residential), and/or an occlusion state. The perception component 114 may operate to determine whether to associate a current object detection (e.g., of the current observation data) with one or more other previously processed object detections. Information from associated object detections may be aggregated into track data of an associated tracked object. In some examples, the data aggregated into the track data may comprise fused observation data output from the Kalman filter for the tracked object, a current state of the Kalman filter, and/or a portion of the pipeline data output for the current time and/or one or more previous times.

Upon determining the current observation data is associated with a tracked object of an existing track, the current state of the Kalman filter for the existing track may be loaded into the Kalman filter. The observation data may be input to the covariance model 120. The covariance model 120 may output observation covariance values for an observation covariance matrix for the observation data. The observation data and observation covariance matrix may be input to the Kalman filter 142. The Kalman filter 142 may be operated through a predict and update cycle based on the observation data and observation covariance matrix and output fused observation data for the tracked object associated with the observation data.

At operation 144, the system may use the output of the Kalman filter. For example, the system may update a track to include the fused observation data values as tracked object data is used for object tracking (also referred to as "state update" or "track update" for an object tracker). In examples, the determined fused observation data may additionally, or alternatively, be used for other operations, such as generating a trajectory for a vehicle, detecting a potential collision with an object, avoiding a collision with an object, providing augmented reality (AR) content for an object, and so on. Example 146 illustrates using the Kalman filter output 148 (e.g., shown as a bounding box) to track an object (a vehicle in this example).

Example Process

Figure 2:
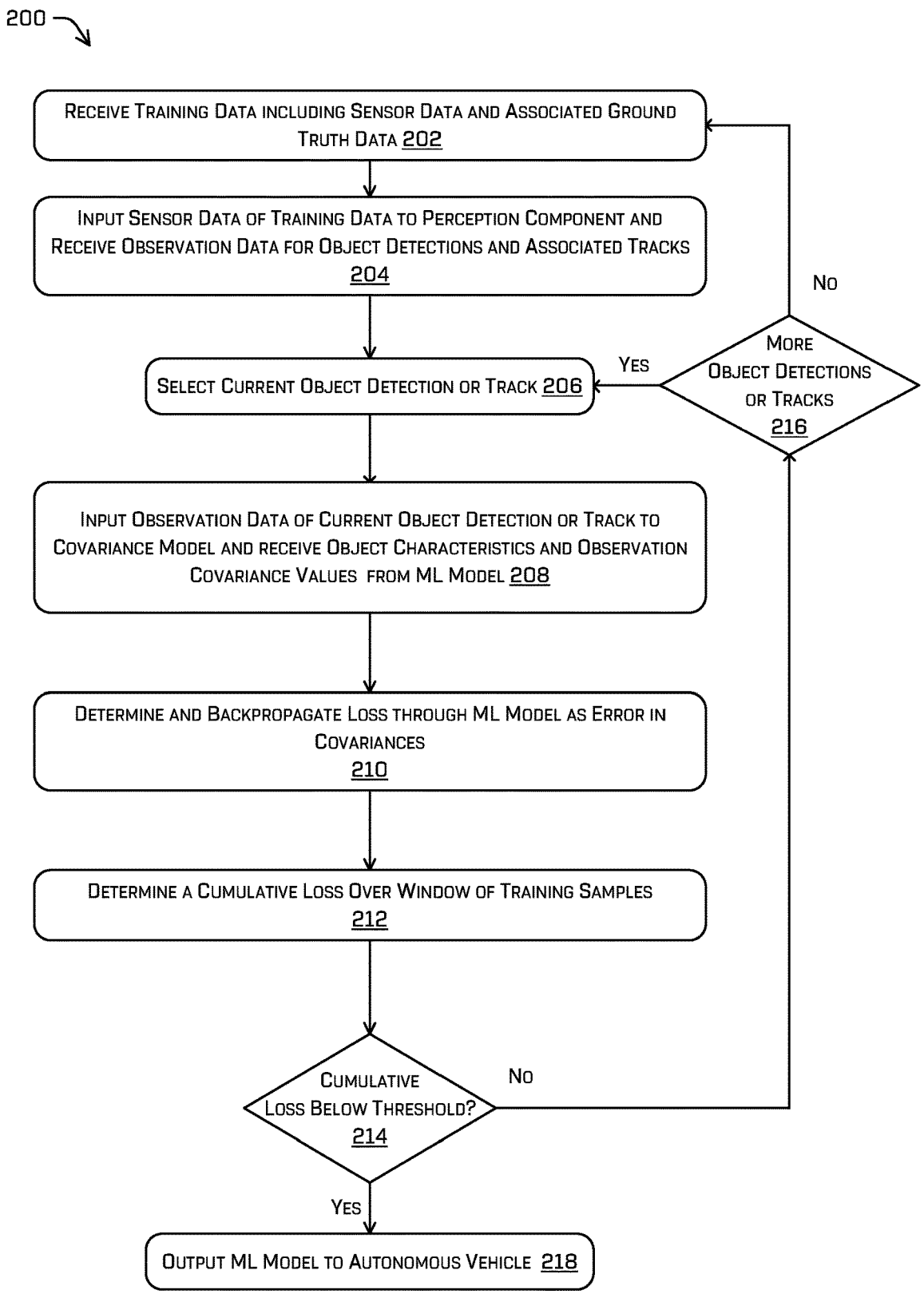
FIG. 2 illustrates an example flow diagram for training a covariance model.

FIG. 2 illustrates a flow diagram of an example process 200 for training a covariance model such as that discussed above with respect to FIG. 1. In some examples, process 200 may be performed by a training component and a covariance model. The training component 118 and covariance model 120 of FIG. 1, respectively, may perform the process 200, although it is contemplated that one or more other components may perform at least part of example process 200.

At 202, example process 200 may comprise receiving training data including sensor data and associated ground truth data. In one example, the ground truth data may include user annotated data indicating ground truth bounding box(es) (e.g., X, Y, Z position coordinates, X, Y, Z extents, and a yaw), ground truth distance information, ground truth track classification(s), ground truth track occlusion state data and so on. Sensor data may include lidar data, radar data, depth sensor data (time of flight, structured light, etc.), image data (e.g., still images, video images, etc.), and/or any other form of data captured by a sensor. In some examples, sensor data may be captured and logged by a vehicle, such as an autonomous vehicle, while the vehicle traverses an environment. In other examples, the sensor data is captured by other systems.

At 204, example process 200 may comprise providing the sensor data of the training data to a perception component and receiving observation data for object detections and associated tracks. For example, a pipeline of the perception component associated with the type of sensor(s) that generated the sensor data may determine object detections from the sensor data. The perception component may include a tracking component that may associate each object detection with a track. In general, tracking may comprise determining whether to associate a current object detection (e.g., observation) with one or more other previously processed object detections. The tracking component may determine whether a current object detection matches an existing tracked object by determining if an intersection over union (IOU) of an object identified in the current object detection with the existing tracked object meets or exceeds a threshold. In some examples, when a current object detection is matched to an existing track, observation data related to the current object detection may be added or associated to the existing track. On the other hand, if no match is determined, a new track may be generated and observation data of the current object detection may be associated therewith.

At 206, the example process 200 may comprise selecting a current object detection or track. For example, the training component may select an unprocessed object detection and the associated track to process.

In the illustrated example, the covariance model may include an ML model that comprises multiple output heads. Each head may provide an output for an associated set of situational or environmental characteristics. In such an example ML model, at least some of the connections from the input layer to the different output heads may be shared. In addition to selecting the current object detection or track, at 206, the example process 200 may determine if the training process is configured to utilize the output of the head corresponding to the situational or environmental characteristics of the current observation data and, if needed, configure the training process to do so.

In other examples, the example process 200 may comprise determining if the correct ML model for the current observation data is loaded into the covariance model. For example, the covariance model may include different ML models trained for observation data associated with various situational or environmental characteristics. Such situational or environmental characteristics may include one or more of a classification of the tracked object (e.g., vehicle, pedestrian, etc.), a type of sensor or format of data associated with the current observation data (e.g., lidar sensors, radar sensors, image sensors, etc.), an environment or location classification (e.g., highway, residential road, parking lot, etc.) and so on.

If the example process 200 determines the correct ML model is loaded, the process may continue to 208. Otherwise, the example process 200 may comprise loading the correct ML model into the covariance model. For example, the covariance model may load different machine learned parameters for the machine learned model, or different ML models, based on the classification of the observed object prior to inputting the observation data to the ML model of the covariance model.

At 208, the example process 200 may comprise inputting observation data of the current object detection or track to the covariance model and receiving object characteristics and observation covariance values from ML model. The observation data input to the ML model may include an object bounding box (e.g., X, Y, Z position coordinates, X, Y, Z extents, and a yaw), distance information, an environment classification, track occlusion state data and so on. In an example utilizing an object bounding box of the observation data, the observation covariance values may be used to populate a seven by seven square observation covariance matrix including covariances between the seven values of the bounding box (e.g., X, Y, Z position coordinates, X, Y, Z extents, and a yaw). In addition to the observation covariance values, the received object characteristics may include, for example, a model generated bounding box.

At 210, the example process 200 may comprise determining and backpropagating a loss through the ML model as an error in the observation covariance values. The training component may determine the loss based on the object characteristics output by the ML model and corresponding ground truth data.

In some examples, to match ground truth data to tracks or observation data output by the perception component, the training component may determine a score between a ground truth bounding box and the observation data of the track. A score may indicate how closely a ground truth bounding box matches a bounding box associated with a tracked object (e.g., a representative bounding box for the tracked object). In some examples, intersection over union (IOU) techniques may be used to determine a score. The training component may identify a ground truth bounding box that is most similar to the bounding box of the tracked object based on the scores. The training component may map the ground truth bounding box to the associated track for loss determination and backpropagation.

As mentioned above, the ML model may output observation covariance values and estimated object characteristics (e.g., a model generated bounding box) for the observation data. The training component may determine a difference between the estimated object characteristics and the ground truth data (e.g., a difference between a model generated bounding box and a ground truth bounding box). The difference may then be used to backpropagate loss(es) through the ML model. More particularly, the differences in bounding boxes may be treated as errors in the observation covariance values and the errors may be used to determine losses for back propagation.

At 212, the example process 200 may determine or update a cumulative loss over a window of training samples (e.g., a number of object detections or track updates of one or more sets of training data). Then, at 214, the example process 200 may determine if the cumulative loss is below a threshold. If not, the process may continue to operation 216. Otherwise, the process may continue to operation 218. Of course, examples are not limited to training until a cumulative loss falls below a threshold. For example, the process 200 may continue processing training data for a predetermined time or a predetermined number of training cycles. Other variations are contemplated.

At 216, the example process 200 may determine whether there remain unprocessed object detections or tracks from the current training data. If so, the process may return to 206. If not, the process may return to 202 where additional training data may be received and processed.

Returning to 218 which may be reached when the cumulative loss falls below a threshold, the example process 200 may comprise outputting the covariance model to an autonomous vehicle. More particularly, the covariance model may be output for usage with a Kalman filter of the perception component of the autonomous vehicle, for example, in fusing observation data determined based on sensor data generated by sensors of the autonomous vehicle.

Figure 3:
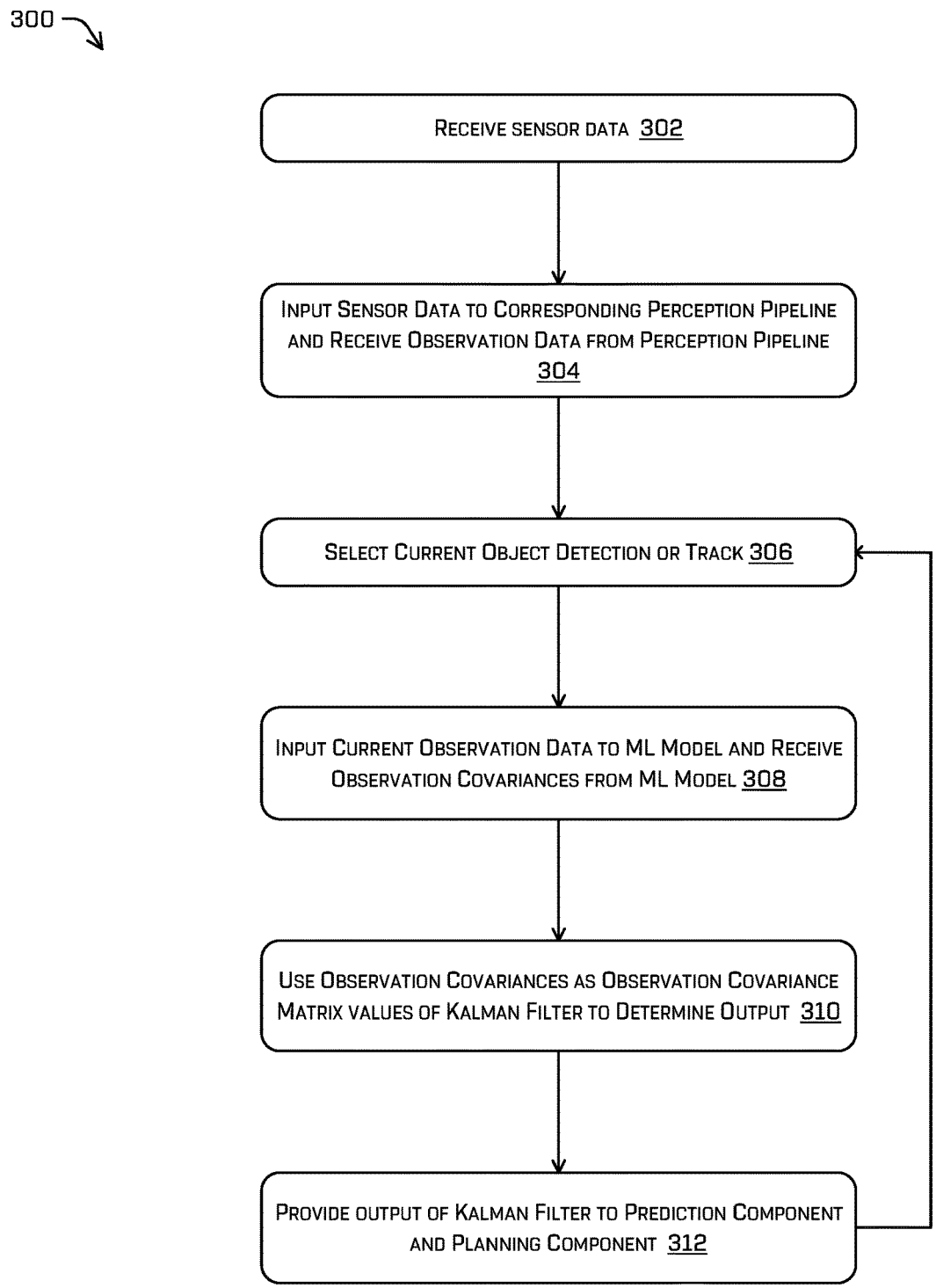
FIG. 3 illustrates an example data flow diagram for using a covariance model to generate an observation covariance matrix used by a Kalman filter.

FIG. 3 illustrates a block diagram of an example data flow 300 within a perception system of an autonomous vehicle including a perception component (e.g., component 114) and a covariance model (e.g., covariance model 120). The perception component 114 and covariance model 120 of FIG. 1 may perform the process 300, although it is contemplated that one or more other components may perform at least part of example process 300.

At 302, example process 300 may comprise receiving sensor data from one or more sensors. Sensor data may include lidar data, radar data, depth sensor data (time of flight, structured light, etc.), image data (e.g., still images, video images, etc.), and/or any other form of data captured by a sensor. In some examples, sensor data may be captured by a vehicle, such as an autonomous vehicle, while the vehicle traverses an environment. In other examples, the sensor data is captured by other systems.

At 304, example process 300 may comprise providing the sensor data to a perception component and receiving observation data for object detections and associated tracks. For example, a pipeline of the perception component associated with the type of sensor(s) that generated the sensor data may determine object detections from the sensor data. The perception component may include a tracking component that may associate each object detection with a track which may include or be in turn associated with the observation data of the associated object detection.

At 306, the example process 300 may comprise selecting a current object detection or track. For example, the perception component may select an unprocessed object detection and the associated track to process. Depending on the example, the perception component may continuously generate and queue object detections and associated tracks for processing by the covariance model and Kalman filter. In other examples, the perception component, covariance model and Kalman filter may process all object detections associated with a set of sensor data prior to handling a next set of sensor data (e.g., from the same or a different sensor system).

In the illustrated example, the covariance model may include an ML model that comprises multiple output heads. Each head may provide an output for an associated set of situational or environmental characteristics. In such an example ML model, at least some of the connections from the input layer to the different output heads may be shared. In addition to selecting the current object detection or track, at 306, the example process 300 may determine if the Kalman filter is configured to utilize the output of the head corresponding to the situational or environmental characteristics of the current observation data and, if needed, configure the Kalman filter to do so.

In other examples, the example process 300 may comprise determining if the correct ML model for the current observation data is loaded into the covariance model. For example, the covariance model may include different ML models trained for observation data associated with various situational or environmental characteristics. Such situational or environmental characteristics may include one or more of a classification of the tracked object (e.g., vehicle, pedestrian, etc.), a type of sensor or format of data associated with the current observation data (e.g., lidar sensors, radar sensors, image sensors, etc.), an environment or location classification (e.g., highway, residential road, parking lot, etc.) and so on.

If the example process 300 determines the correct ML model is loaded, the process may continue to 308. Otherwise, the example process 300 may comprise loading the correct ML model into the covariance model. For example, the covariance model may load different machine learned parameters for the machine learned model, or different ML models, based on the classification of the observed object prior to inputting the observation data to the ML model of the covariance model.

At 308, the example process 300 may comprise inputting observation data of the current object detection or track into the covariance model and receiving observation covariance values from ML model. The observation data input to the ML model may include an object bounding box (e.g., X, Y, Z position coordinates, X, Y, Z extents, and a yaw), distance information, an environment classification, track occlusion state data and so on. In an example utilizing an object bounding box of the observation data, the observation covariance values may be used to populate a seven by seven square observation covariance matrix including covariances between the seven values of the bounding box (e.g., X, Y, Z position coordinates, X, Y, Z extents, and a yaw).

At 310, the example process 300 may comprise performing Kalman filtering on observation data using the observation covariance values output by the covariance model. In some examples, where the current observation data is associated with an existing track, the current state of the Kalman filter for the existing track may be loaded into the Kalman filter. The Kalman filter may then receive the observation covariance values and observation data as input. The Kalman filter 142 may be operated through a predict and update cycle based on the current state of the Kalman filter, the observation data and the observation covariance matrix to output fused observation data for the tracked object associated with the observation data. In some examples, the Kalman filter may fuse observation data output from individual perception pipelines to provide more accurate observation data than each individual pipeline alone.

At 312, the example process 300 may comprise providing the output of the Kalman filter to the prediction component and planning component of an autonomous vehicle system. Then, the example process 300 may return to 306 to select and process the next object detection or track.

Example System

Figure 4:
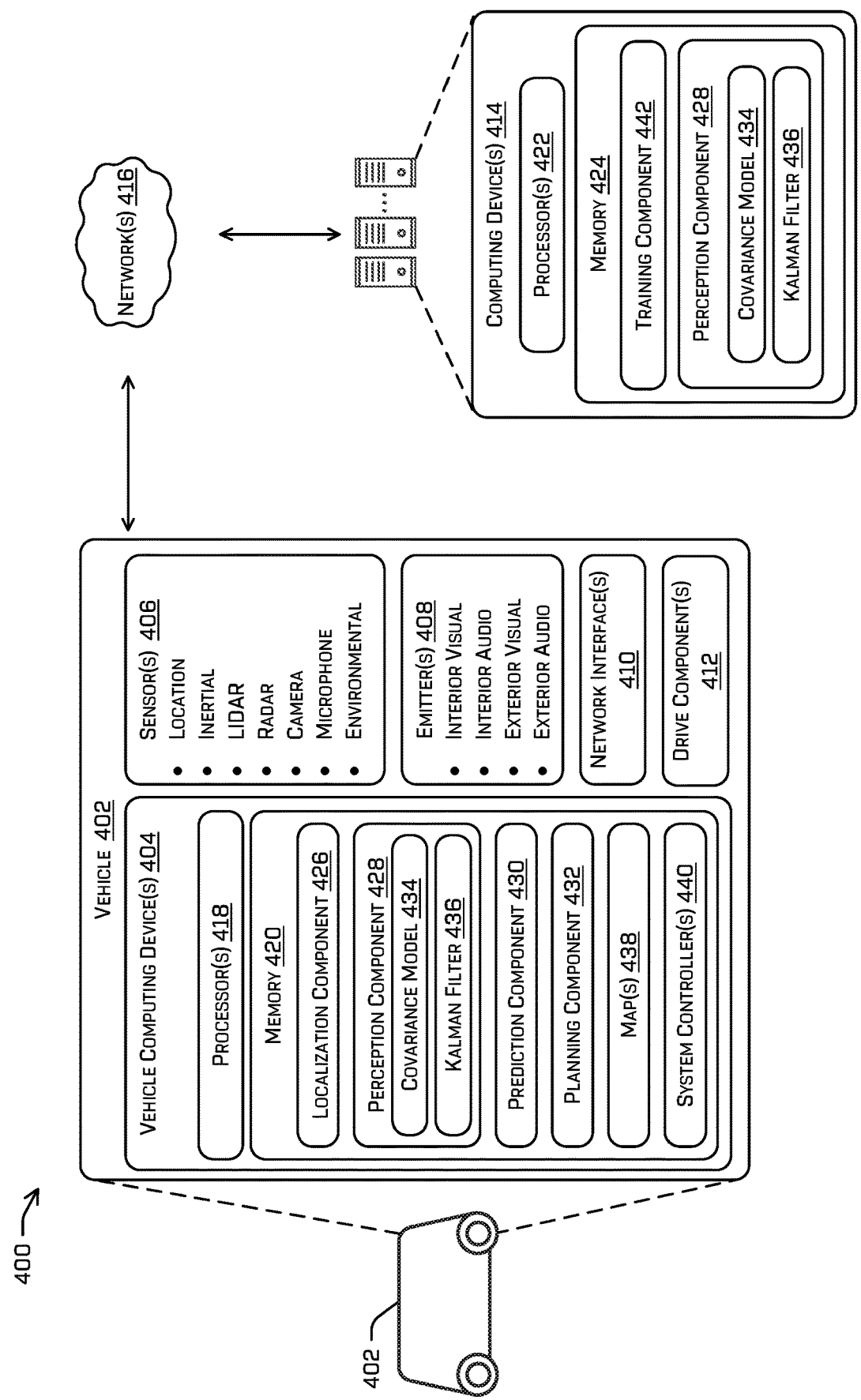
FIG. 4 illustrates a block diagram of an example system comprising a perception component including a covariance model and a Kalman filter.

FIG. 4 illustrates a block diagram of an example system 400 that implements the techniques discussed herein. In some instances, the example system 400 may include a vehicle 402. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well.

The vehicle 402 may include a vehicle computing device(s) 404, sensor(s) 406, emitter(s) 408, network interface(s) 410, and/or drive component(s) 412. The system 400 may additionally or alternatively comprise computing device(s) 414.

In some instances, the sensor(s) 406 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 406 may include multiple instances of each of these or other types of sensors. For instance, the radar sensors may include individual radar sensors located at the corners, front, back, sides, and/or top of the vehicle 402. As another example, the cameras may include multiple cameras disposed at various locations about the exterior and/or interior of the vehicle 402. The sensor(s) 406 may provide input to the vehicle computing device(s) 404 and/or to computing device(s) 414.

The vehicle 402 may also include emitter(s) 408 for emitting light and/or sound, as described above. The emitter(s) 408 in this example may include interior audio and visual emitter(s) to communicate with passengers of the vehicle 402. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 408 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 402 may also include network interface(s) 410 that enable communication between the vehicle 402 and one or more other local or remote computing device(s). For instance, the network interface(s) 410 may facilitate communication with other local computing device(s) on the vehicle 402 and/or the drive component(s) 412. Also, the network interface(s) 410 may additionally or alternatively allow the vehicle to communicate with other nearby computing device(s) (e.g., other nearby vehicles, traffic signals, etc.). The network interface(s) 410 may additionally or alternatively enable the vehicle 402 to communicate with computing device(s) 414. In some examples, computing device(s) 414 may comprise one or more nodes of a distributed computing system (e.g., a cloud computing architecture).

The network interface(s) 410 may include physical and/or logical interfaces for connecting the vehicle computing device(s) 404 to another computing device or a network, such as network(s) 416. For example, the network interface(s) 410 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 404 and/or the sensor(s) 406 may send sensor data, via the network(s) 416, to the computing device(s) 414 at a particular frequency, after a lapse of a predetermined period of time, in near real-time, etc.

In some instances, the vehicle 402 may include one or more drive components 412. In some instances, the vehicle 402 may have a single drive component 412. In some instances, the drive component(s) 412 may include one or more sensors to detect conditions of the drive component(s) 412 and/or the surroundings of the vehicle 402. By way of example and not limitation, the sensor(s) of the drive component(s) 412 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 412. In some cases, the sensor(s) on the drive component(s) 412 may overlap or supplement corresponding systems of the vehicle 402 (e.g., sensor(s) 406).

The drive component(s) 412 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 412 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 412. Furthermore, the drive component(s) 412 may also include one or more communication connection(s) that enable communication by the respective drive component with one or more other local or remote computing device(s).

The vehicle computing device(s) 404 may include processor(s) 418 and memory 420 communicatively coupled with the one or more processors 418. Computing device(s) 414 may also include processor(s) 422, and/or memory 424. The processor(s) 418 and/or 422 may be any suitable processor capable of executing instructions to process data and perform operations as described herein. By way of example and not limitation, the processor(s) 418 and/or 422 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 420 and/or 424 may be examples of non-transitory computer-readable media. The memory 420 and/or 424 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 420 and/or memory 424 may store a localization component 426, perception component 428, prediction component 430, planning component 432, covariance model 434, Kalman filter 436, map(s) 438, system controller(s) 440 and/or a training component 442. Perception component 428 may represent perception component 114, covariance model 434 may represent covariance model 120 and/or Kalman filter 436 may represent Kalman filter 142.

In at least one example, the localization component 426 may include hardware and/or software to receive data from the sensor(s) 406 to determine a position, velocity, and/or orientation of the vehicle 402 (e.g., one or more of an x-, y-, z-position, roll, pitch, or yaw). For example, the localization component 426 may include and/or request/receive map(s) 438 of an environment and can continuously determine a location, velocity, and/or orientation of the autonomous vehicle within the map(s) 438. In some instances, the localization component 426 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 426 may provide data to various components of the vehicle 402 to determine an initial position of an autonomous vehicle for generating a trajectory and/or for generating map data, as discussed herein. In some examples, localization component 426 may provide, to the perception component 428, a location and/or orientation of the vehicle 402 relative to the environment and/or sensor data associated therewith.

In some instances, perception component 428 may comprise a primary perception system and/or a prediction system implemented in hardware and/or software. The perception component 428 may detect object(s) in in an environment surrounding the vehicle 402 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 428 is referred to as perception data.

The prediction component 430 can generate one or more probability maps representing prediction probabilities of possible locations of one or more objects in an environment. For example, the prediction component 430 can generate one or more probability maps for vehicles, pedestrians, animals, and the like within a threshold distance from the vehicle 402. In some instances, the prediction component 430 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 432 may receive a location and/or orientation of the vehicle 402 from the localization component 426 and/or perception data from the perception component 428 and may determine instructions for controlling operation of the vehicle 402 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 440 and/or drive component(s) 412 may parse/cause to be carried out, second instructions for the emitter(s) 408 may be formatted according to a second format associated therewith).

The covariance model 434 and Kalman filter 436 of the perception component 428 may operate on the vehicle 402 and/or on the computing device(s) 414. In some examples, the covariance model 434 and Kalman filter 436 of the perception component 428 may be downstream of the perception pipelines and upstream (provide input to) from the prediction component 430 and planning component 432 in a pipeline. In some implementations, the covariance model 434 and Kalman filter 436 may work in conjunction with a tracking component of the perception component 428. For example, the covariance model 434 and Kalman filter 436 of the perception component 428 may operate to fuse observation data of a new object detection with track data of a tracked object associated with an existing track.

In some examples, the perception component 428 may produce pipeline or observation data based on the sensor data received from the sensors 406. For example, the perception component 428 may include perception pipelines associated with sets of sensors. In some examples, each type of sensor 406 may be associated with one or more perception pipelines of the perception component 428. Some perception pipelines may be associated with multiple types of sensors. In addition or alternatively, some perception pipelines may operate based on detection and/or tracking data output by one or more other perception pipelines. The multiple pipelines may each detect objects and generate detections for objects each input cycle. At any rate, the tracking component may determine whether or not to associate an object detection in the pipeline data with an existing track or to generate a new track in association with an object detection.

The covariance model 434 may, in some examples, comprise a one or more machine learned models that may infer observation covariance values for observation data of an object detection. Additional details of the operation of covariance model 434 may be understood with reference to the discussion above of covariance model 120 and example process 300.

The Kalman filter 436 may operate to fuse the observation data of new object detections with track data of existing tracks based at least in part on an observation covariance matrix populated with observation covariance values output by the covariance model 434. Additional details of the operation of Kalman filter 436 may be understood with reference to the discussion above of Kalman filter 142 and example process 300.

The training component 442 may operate to perform machine learning training operations for the covariance model 434. In particular, the training component 442 may train the covariance model 434 to output observation covariance values based on observation data of object detections. Additional details of the operation of training component may be understood with reference to the discussion above of training component 118 and example process 200.

Although localization component 426, prediction component 430, planning component 432, map(s) 438, and/or system controller(s) 440 are illustrated as being stored in memory 420, any of these components may include processor-executable instructions, machine-learned model(s) (e.g., a neural network), and/or hardware and all or part of any of these components may be stored on memory 424 or configured as part of computing device(s) 414.

As described herein, the localization component 426, the perception component 428, prediction component 430, planning component 432, and/or other components of the system 400 may comprise one or more ML models. For example, the localization component 426, the perception component 428, prediction component 430, and/or the planning component 432 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis s (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 420 may additionally or alternatively store one or more system controller(s) 440, which may be configured to control steering, propulsion, braking, safety, emitters, communication, and other systems of the vehicle 402. These system controller(s) 440 may communicate with and/or control corresponding systems of the drive component(s) 412 and/or other components of the vehicle 402. For example, the planning component 432 may generate instructions based at least in part on perception data and prediction data generated by the perception component 428 and prediction component 430. The system controller(s) 440 may control operation of the vehicle 402 based at least in part on the instructions received from the planning component 432.

It should be noted that while FIG. 4 is illustrated as a distributed system, in alternative examples, components of the vehicle 402 may be associated with the computing device(s) 414 and/or components of the computing device(s) 414 may be associated with the vehicle 402. That is, the vehicle 402 may perform one or more of the functions associated with the computing device(s) 414, and vice versa.

Example Clauses

A. A method comprising: determining, based at least in part on sensor data, observation data for an object detection of an object represented in the sensor data; inputting one or more of the sensor data or the observation data associated with the object detection into a covariance machine-learning (ML) model; receiving, as output from the covariance ML model: an observation covariance associated with the observation data; and model observation data; receiving ground truth data associated with the object detection; determining a loss based at least in part on the model observation data and the ground truth data; altering, as a trained ML model, one or more parameters of the covariance ML model to reduce the loss; and transmitting the trained ML model to an autonomous vehicle.

B. The method of clause A, wherein the observation data comprises one or more of: a bounding box associated with the object; a classification of the object; an environment classification in which the object is located comprising one of: a highway classification;

a residential road classification; and a parking lot classification; a sensor type associated with the sensor data; distance information to the object; or an occlusion state; the ground truth data comprises a ground truth bounding box associated with the object; and the model observation data comprises a model bounding box associated with the object.

C. The method of clause A, wherein the observation data is first observation data, the object detection is a first object detection, and the sensor data is first sensor data associated with a first sensor type, the ground truth data is first ground truth data, the model observation data is first model observation data, the observation covariance is a first observation covariance, and the first observation covariance and the model observation data are received from a first output head of the covariance ML model associated with the first sensor type, the method further comprising: inputting second observation data associated with a second object detection of the object represented in second sensor data associated with a second sensor type into the covariance ML model; receiving, as a second output from a second output head of the covariance ML model associated with the second sensor type: a second observation covariance associated with the second observation data; second model observation data; receiving second ground truth data associated with the second object detection; determining a second loss based at least in part on the second model observation data and the second ground truth data; and altering, as a second trained ML model, the trained ML model to reduce the second loss.

D. The method of clause C, wherein: the first output head is further associated with a first environmental classification in which the object is located; and a third output head of the covariance ML model is associated with the first sensor type and a second environmental classification different from the first environmental classification.

E. A system comprising: one or more processors; and a memory storing processor-executable instructions that, when executed by the one or more processors, cause the system to perform operations comprising: inputting, into a covariance ML model, one or more of sensor data associated with an object detection of an object represented in the sensor data or observation data for an object detection of an object represented in the sensor data; receiving, as output from the covariance ML model, an observation covariance associated with the observation data; determining a loss based at least in part on the output; altering, as a trained ML model, one or more parameters of the covariance ML model to reduce the loss; and transmitting the trained ML model to an autonomous vehicle.

F. The system of clause E, wherein: the observation data comprises one or more of: a bounding box associated with the object; a classification of the object; an environment classification in which the object is located comprising one of: a highway classification; a residential road classification; and a parking lot classification; a sensor type associated with the sensor data; distance information to the object; or an occlusion state.

G. The system of clause E, wherein the output from the covariance ML model further comprises model observation data comprising a model bounding box associated with the object.

H. The system of clause G, the operations further comprising: receiving ground truth data associated with the object detection, wherein: the ground truth data comprises a ground truth bounding box associated with the object.

I. The system of clause H, the operations further comprising: the determining the loss is further based at least in part on the ground truth bounding box and the model bounding box; and performing the altering of the one or more parameters by backpropagating the loss to one or more nodes of the covariance ML model whose output the observation covariance is based at least in part.

J. The system of clause I, wherein the observation data is first observation data, the object detection is a first object detection, and the sensor data is first sensor data associated with a first sensor type, the ground truth data is first ground truth data, the model observation data is first model observation data, the observation covariance is a first observation covariance, and the first observation covariance and the model observation data are received from a first output head of the covariance ML model associated with the first sensor type, the operations further comprising: inputting second observation data associated with a second object detection of the object represented in second sensor data associated with a second sensor type into the covariance ML model; and receiving, as a second output from a second output head of the covariance ML model associated with the second sensor type: a second observation covariance associated with the second observation data; and second model observation data.

K. The system of clause J, the operations further comprising: receiving second ground truth data associated with the second object detection; determining a second loss based at least in part on the second model observation data and the second ground truth data; and altering, as a second trained ML model, the trained ML model to reduce the second loss.

L. The system of clause K, the operations further comprising: the first output head is further associated with a first environmental classification in which the object is located; and a third output head of the covariance ML model is associated with the first sensor type and a second environmental classification different from the first environmental classification.

M. The system of clause K, the operations further comprising: the first output head is further associated with a first object classification of the object; and a third output head of the covariance ML model is associated with the first sensor type and a second object classification different from the first object classification.

N. The system of clause E, wherein the covariance ML model comprises a plurality of machine learned models associated with respective sets of one or more situational factors, the one or more situational factors comprising: an object classification of a plurality of object classifications; an environment classification of a plurality of environment classifications in which observed objects are located comprising one of: a highway classification; a residential road classification; and a parking lot classification; or a sensor type of a plurality of sensor types.

O. One or more non-transitory computer-readable media storing processor-executable instructions that, when executed by one or more processors, cause n to perform operations comprising: determining, based at least in part on sensor data, observation data for an object detection of an object represented in the sensor data; inputting one or more of the sensor data or the observation data associated with the object detection into a covariance ML model; receiving, as output from the covariance ML model an observation covariance associated with the observation data; determining a loss based at least in part on the output; altering, as a trained ML model, one or more parameters of the covariance ML model to reduce the loss; and transmitting the trained ML model to an autonomous vehicle.

P. The one or more non-transitory computer-readable media of clause O, the operations further comprising: receiving ground truth data associated with the object detection, wherein the ground truth data comprises a ground truth bounding box associated with the object and the determining the loss is further based at least in part on the ground truth data; and performing the altering of the one or more parameters by backpropagating the loss.

Q. The one or more non-transitory computer-readable media of clause P, wherein the output from the covariance ML model further comprises model observation data comprising a model bounding box associated with the object, the operations further comprising: the determining the loss is further based at least in part on the model bounding box; and performing the altering of the one or more parameters by backpropagating the loss to one or more nodes of the covariance ML model whose output the observation covariance is based at least in part.

R. The one or more non-transitory computer-readable media of clause Q, wherein the observation data is first observation data, the object detection is a first object detection, the sensor data is first sensor data associated with a first sensor type, the ground truth data is first ground truth data, the model observation data is first model observation data, the observation covariance is a first observation covariance, and the first observation covariance and the model observation data are received from a first output head of the covariance ML model associated with the first sensor type, the operations further comprising: inputting second observation data associated with a second object detection of the object represented in second sensor data associated with a second sensor type into the covariance ML model; and receiving, as a second output from a second output head of the covariance ML model associated with the second sensor type: a second observation covariance associated with the second observation data; and second model observation data.

S. The one or more non-transitory computer-readable media of clause R, the operations further comprising: receiving second ground truth data associated with the second object detection; determining a second loss based at least in part on the second model observation data and second the ground truth data; and altering, as a second trained ML model, the trained ML model to reduce the second loss.

T. The one or more non-transitory computer-readable media of clause O, wherein the observation data comprises one or more of: a bounding box for the object; distance information to the object; a classification of the object; an environment classification in which the object is located comprising one of: a highway classification; a residential road classification; and a parking lot classification; or an occlusion state.

U. A method comprising receiving sensor data; determining, based at least in part on the sensor data, an object detection of an object represented in the sensor data; receiving track data comprising at least state information of a Kalman filter; determining that the track data is associated with the object detection; inputting observation data associated with the object detection into a machine-learning (ML) model of a covariance model; receiving, as output from the covariance model, an observation covariance value for the observation data; determining, by the Kalman Filter and based at least in part on the state information, an observation covariance matrix based at least in part on the observation covariance value, and the observation data, updated track data; and outputting the updated track data to a planning component of an autonomous vehicle.

V. The method of clause U, further comprising: determining, by the planning component, an instruction for controlling the autonomous vehicle based at least in part on the track data; and controlling the autonomous vehicle based at least in part on the instruction.

W. The method of clause U, further comprising: at least one of: determining a ML model parameter of a ML model based at least in part on the observation data; or determining, as the observation covariance value, an output head of the ML model.

X. The method of clause U, wherein the observation data comprises one or more of: a classification of the object; an environment classification in which the object is located; or a sensor type associated with the sensor data.

Y. The method of clause U, wherein the sensor data is first sensor data associated with a first sensor type, the object detection is a first object detection, the observation data is first observation data, the updated track data is first updated track data; the method further comprising: reconfiguring, as a reconfigured covariance model, the covariance model based at least on second sensor data associated with a second sensor type; inputting second observation data associated with a second object detection of the object represented in the second sensor data into the reconfigured covariance model; receiving, as output from the reconfigured covariance model, a second observation covariance value for the second observation data; and determining, by the Kalman Filter and based at least in part on the updated state information, a second observation covariance matrix based at least in part on the second observation covariance value, and the second observation data, second updated track data.

Z. A system comprising: one or more processors; and a memory storing processor-executable instructions that, when executed by the one or more processors, cause the system to perform operations comprising: determining, based at least in part on sensor data, observation data for an object detection of an object represented in the sensor data; inputting the observation data into a covariance model; receiving, as output from the covariance model, an observation covariance associated with the observation data; and determining updated track data based on at least part of the track data, the observation covariance, and the observation data.

AA. The system of clause Z, the operations further comprising: outputting the updated track data to a planning component of an autonomous vehicle; determining, by the planning component, an instruction for controlling the autonomous vehicle; and controlling the autonomous vehicle based at least in part on the instruction.

AB. The system of clause Z, wherein the covariance model comprises a plurality of outputs, the operations further comprising: determining, based at least in part on the plurality of outputs and the observation data, the observation covariance.

AC. The system of clause AA, wherein an output of the plurality of outputs is associated with an environmental characteristic.

AD. The system of clause AB, wherein the environmental characteristic comprises one or more of: a classification of the object; or an environment classification in which the object is located.

AE. The system of clause AB, wherein the covariance model comprises one or more of a plurality of machine learned models or multiple output heads.

AF. The system of clause Z, the operations further comprising: receiving the sensor data; determining, based at least in part on the sensor data, the object detection of the object represented in the sensor data; receiving the track data; and determining that the track data is associated with the object detection.

AG. The system of clause Z, wherein the track data comprises state information of a Kalman filter, the determining the updated track data comprising: determining, by the Kalman Filter and based at least in part on the state information, an observation covariance matrix based at least in part on the observation covariance value, and the observation data, the updated track data.

AH. The system of clause Z, wherein the observation data comprises one or more of: a bounding box for the object; distance information to the object; a classification of the object; an environment classification in which the object is located; or an occlusion state.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving sensor data;
   determining observation data associated with an object represented in the sensor data;
   inputting the observation data associated with the object represented in the sensor data into a machine-learning (ML) model;
   receiving, as output from an output head of a plurality of output heads of the ML model, an observation covariance value associated with the observation data associated with the object represented in the sensor data, wherein an individual output head of the plurality of output heads is associated with one or more of an object classification, an environment classification, and a sensor type, and
   wherein the observation covariance value represents a measure of joint variability of two or more instances of the observation data;
   determining, based at least in part on the observation covariance value, track data associated with the object represented in the sensor data; and
   outputting the track data to a planning component of an autonomous vehicle.

2. The method of claim 1, further comprising determining one or more of:
   a bounding box associated with the object represented in the sensor data;
   a classification of the object represented in the sensor data;
   distance information associated with the object represented in the sensor data;
   an environment classification associated with the object represented in the sensor data; or
   an occlusion state associated with the object represented in the sensor data.

3. The method of claim 1, further comprising:
   generating an observation covariance matrix comprising the observation covariance value; and
   determining the track data further based on inputting the observation covariance matrix into the ML model, wherein the ML model comprises a Kalman filter.

4. The method of claim 1, wherein the track data comprises one or more of:
   current kinematic data associated with the object represented in the sensor data; or
   prior kinematic data associated with the object represented in the sensor data.

5. The method of claim 1, further comprising:
   determining, based on the sensor data, a classification of the object represented in the sensor data; and
   determining the observation covariance value based at least in part on the classification of the object represented in the sensor data.

6. The method of claim 1, further comprising:
   receiving the sensor data from a plurality of sensors, the plurality of sensors comprising one or more of lidar, radar, vision, or lidar-vision.

7. The method of claim 6, further comprising:
   determining the observation covariance value based at least in part on a sensor type of a sensor generating the sensor data.

8. The method of claim 1, further comprising inputting the sensor data into a perception component periodically, and wherein one or more of:
   determining the observation data associated with the object represented in the sensor data; or
   inputting the observation data associated with the object represented in the sensor data into the ML model is synchronized to occur periodically with the inputting the sensor data into the perception component.

9. A system comprising:
one or more processors; and
one or more non-transitory computer-readable media containing instructions that, when executed by the one or more processors, cause the system to perform operations comprising:
receiving sensor data;
determining observation data associated with an object represented in the sensor data;
inputting the observation data associated with the object represented in the sensor data into a machine-learning (ML) model;
receiving, as output from an output head of a plurality of output heads of the ML model, an observation covariance value associated with the observation data associated with the object represented in the sensor data, wherein an individual output head of the plurality of output heads is associated with one or more of an object classification, an environment classification, and a sensor type, and
wherein the observation covariance value represents a measure of joint variability of two or more instances of the observation data;
determining, based at least in part on the observation covariance value, track data associated with the object represented in the sensor data; and
outputting the track data to a planning component of an autonomous vehicle.

10. The system of claim 9, the operations further comprising determining one or more of:
a bounding box associated with the object represented in the sensor data;
a classification of the object represented in the sensor data;
distance information associated with the object represented in the sensor data;
an environment classification associated with the object represented in the sensor data; or
an occlusion state associated with the object represented in the sensor data.

11. The system of claim 9, the operations further comprising:
generating an observation covariance matrix comprising the observation covariance value; and
determining the track data further based on inputting the observation covariance matrix into the ML model, wherein the ML model comprises a Kalman filter.

12. The system of claim 9, wherein the track data comprises one or more of:
current kinematic data associated with the object represented in the sensor data; or
prior kinematic data associated with the object represented in the sensor data.

13. The system of claim 9, the operations further comprising:
determining, based on the sensor data, a classification of the object represented in the sensor data; and
determining the observation covariance value based at least in part on the classification of the object represented in the sensor data.

14. The system of claim 9, the operations further comprising:
receiving the sensor data from a plurality of sensors, the plurality of sensors comprising one or more of lidar, radar, vision, or lidar-vision; and
determining the observation covariance value based at least in part on a sensor type of a sensor generating the sensor data.

15. One or more non-transitory computer-readable media storing instructions that, when executed by one or more processors, cause the one or more processors to perform operations comprising:
receiving sensor data;
determining observation data associated with an object represented in the sensor data;
inputting the observation data associated with the object represented in the sensor data into a machine-learning (ML) model;
receiving, as output from an output head of a plurality of output heads of the ML model, an observation covariance value associated with the observation data associated with the object represented in the sensor data, wherein an individual output head of the plurality of output heads is associated with one or more of an object classification, an environment classification, and a sensor type, and
wherein the observation covariance value represents a measure of joint variability of two or more instances of the observation data;
determining, based at least in part on the observation covariance value, track data associated with the object represented in the sensor data; and
outputting the track data to a planning component of an autonomous vehicle.

16. The one or more non-transitory computer-readable media of claim 15, the operations further comprising determining one or more of:
a bounding box associated with the object represented in the sensor data;
a classification of the object represented in the sensor data;
distance information associated with the object represented in the sensor data;
an environment classification associated with the object represented in the sensor data; or
an occlusion state associated with the object represented in the sensor data.

17. The one or more non-transitory computer-readable media of claim 15, the operations further comprising:
generating an observation covariance matrix comprising the observation covariance value; and
determining the track data further based on inputting the observation covariance matrix into the ML model, wherein the ML model comprises a Kalman filter.

18. The one or more non-transitory computer-readable media of claim 15, wherein the track data comprises one or more of: current kinematic data associated with the object represented in the sensor data; or
prior kinematic data associated with the object represented in the sensor data.

19. The one or more non-transitory computer-readable media of claim 15, the operations further comprising:
receiving the sensor data from a plurality of sensors, the plurality of sensors comprising one or more of lidar, radar, vision, or lidar-vision.

20. The one or more non-transitory computer-readable media of claim 19, the operations further comprising:
determining the observation covariance value based at least in part on a sensor type of a sensor generating the sensor data.

21. The one or more non-transitory computer-readable media of claim 15, the operations further comprising:
- determining, based on the sensor data, a classification of the object represented in the sensor data; and
- determining the observation covariance value based at least in part on the classification of the object represented in the sensor data.

\* \* \* \* \*